US008804535B2

(12) United States Patent
Meloche

(10) Patent No.: US 8,804,535 B2
(45) Date of Patent: Aug. 12, 2014

(54) SYSTEM AND METHOD FOR SENDING PACKETS USING ANOTHER DEVICE'S NETWORK ADDRESS

(75) Inventor: Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 739 days.

(21) Appl. No.: 12/410,980

(22) Filed: Mar. 25, 2009

(65) Prior Publication Data

US 2010/0246411 A1 Sep. 30, 2010

(51) Int. Cl.
*H04L 12/56* (2006.01)
*G06F 15/173* (2006.01)
*G06F 15/16* (2006.01)

(52) U.S. Cl.
USPC ........... 370/241.1; 370/392; 709/223; 726/13

(58) Field of Classification Search
USPC .............. 370/236, 240, 241.1, 242, 331, 352, 370/392, 395.21, 431, 468; 709/223, 224, 709/225, 227, 228, 246–247; 713/151, 153, 713/201; 726/11, 13, 15
See application file for complete search history.

(56) References Cited

U.S. PATENT DOCUMENTS

| | | | |
|---|---|---|---|
| 6,243,454 B1 | 6/2001 | Eslambolchi | |
| 6,411,923 B1 | 6/2002 | Stewart et al. | |
| 6,542,504 B1 | 4/2003 | Mahler et al. | |
| 6,760,345 B1 | 7/2004 | Rosengard | |
| 6,775,240 B1 | 8/2004 | Zhang et al. | |
| 7,136,359 B1 * | 11/2006 | Coile et al. | 370/248 |
| 7,173,910 B2 | 2/2007 | Goodman | |
| 7,203,173 B2 | 4/2007 | Bonney et al. | |
| 7,340,529 B1 | 3/2008 | Yazaki et al. | |
| 7,899,048 B1 | 3/2011 | Walker et al. | |
| 2001/0050903 A1 | 12/2001 | Vanlint | |
| 2002/0009079 A1 * | 1/2002 | Jungck et al. | 370/389 |
| 2002/0012388 A1 | 1/2002 | Eldumiati et al. | |
| 2002/0021680 A1 | 2/2002 | Chen | |

(Continued)

FOREIGN PATENT DOCUMENTS

| | | |
|---|---|---|
| EP | 1763193 A1 | 3/2007 |
| EP | 1228619 B1 | 2/2008 |
| WO | WO 2006/065863 A2 | 6/2006 |
| WO | WO 2007/036786 A2 | 4/2007 |

OTHER PUBLICATIONS

Webpage, "Visual Performance Manager for Application Performance Management—Fluke Networks," (website: http://www.flukenetworks.com/fnet/en-us/products/Visual+Perforamnce+Manager/Overview . . . ), Printed Mar. 13, 2009, Fluke Networks.

(Continued)

*Primary Examiner* — Habte Mered
*Assistant Examiner* — Prince A Mensah
(74) *Attorney, Agent, or Firm* — Sheridan Ross P.C.

(57) ABSTRACT

A network analyzer gets configuration information, usually in the form of a configuration packet sent from a network monitor. The configuration information comprises a second device network address and a third device network address. The second device network address is that of the network monitor and the third device network address is that of a communication device that is to be monitored.

When the network analyzer sees packets from the monitored communication device, it can send the results to the network monitor for analysis without having to be configured with a unique network address. The network analyzer sends an original packet using the network address of the communication device as the source address and using the network address of the network monitor as the destination address.

22 Claims, 3 Drawing Sheets

(56) References Cited

U.S. PATENT DOCUMENTS

| | | |
|---|---|---|
| 2002/0057690 A1 | 5/2002 | Kingsley |
| 2002/0191614 A1 | 12/2002 | Ido et al. |
| 2002/0193999 A1 | 12/2002 | Keane et al. |
| 2003/0028606 A1* | 2/2003 | Koopmans et al. ............ 709/206 |
| 2003/0028634 A1 | 2/2003 | Oshizawa |
| 2003/0086425 A1 | 5/2003 | Bearden et al. |
| 2003/0165162 A1 | 9/2003 | Westphal |
| 2004/0052216 A1* | 3/2004 | Roh .............................. 370/252 |
| 2004/0172464 A1* | 9/2004 | Nag .............................. 709/223 |
| 2005/0038898 A1* | 2/2005 | Mittig et al. .................. 709/230 |
| 2005/0041660 A1 | 2/2005 | Pennec et al. |
| 2006/0174009 A1* | 8/2006 | Martiquet et al. ............ 709/227 |
| 2006/0215596 A1 | 9/2006 | Krishnaswamy et al. |
| 2006/0218447 A1 | 9/2006 | Garcia et al. |
| 2006/0227714 A1 | 10/2006 | Griffin et al. |
| 2007/0081471 A1 | 4/2007 | Talley, Jr. et al. |
| 2007/0086336 A1 | 4/2007 | Richards et al. |
| 2007/0223481 A1* | 9/2007 | Sivakumar et al. ........... 370/392 |
| 2007/0233857 A1* | 10/2007 | Cheng et al. .................. 709/224 |
| 2007/0252695 A1 | 11/2007 | Bhavani |
| 2007/0286351 A1 | 12/2007 | Ethier et al. |
| 2009/0073906 A1 | 3/2009 | Yi et al. |
| 2009/0268622 A1 | 10/2009 | Blum et al. |
| 2010/0027429 A1* | 2/2010 | Jorgens et al. ................ 370/250 |

OTHER PUBLICATIONS

Denby, U.S. Appl. No. 12/039,878, filed Feb. 29, 2008, for "Endpoint Device Configured to Permit User Reporting of Quality Problems in a Communication Network".

Flockhart, et al., U.S. Appl. No. 12/239,120, filed Sep. 26, 2008, for "Clearing House for Publish/Subscribe of Status Data From Distributed Telecommunications Systems".

Meloche, U.S. Appl. No. 12/433,630, filed Apr. 30, 2009, for "System and Method for Monitoring a Network Communication at Multiple Network Layers".

Meloche, U.S. Appl. No. 12/434,265, filed May 1, 2009, for "System and Method for Testing a Dynamic Communication Across a Network".

Meloche, U.S. Appl. No. 12/436,651, filed May 6, 2009, for "Intelligent Multi-Packet Header Compression".

Network Instruments, "VoIP Analysis, Manager, Monitor, and Maintain VoIP Communications Across Enterprise Networks with Observer," 2006, Product Brochure, US, 4 pages.

Meloche, Jean, U.S. Appl. No. 12/533,483, entitled "System and Method for Comparing Packet Traces for Failed and Successful Communications," filed Jul. 31, 2009, 30 pages.

Meloche, Jean, U.S. Appl. No. 12/622,840, entitled "Detection and Display of Packet Changes in a Network," filed Nov. 20, 2009, 27 pages.

Search Report for UK Patent Application No. GB1003056.7, dated Jun. 1, 2010.

Corrected Search Report for UK Patent Application No. GB1003056.7, dated Jun. 1, 2010.

Official Action for UK Patent Application No. GB1003056.7, dated Mar. 14, 2014, 2 pages.

* cited by examiner

SYSTEM AND METHOD FOR SENDING PACKETS USING ANOTHER DEVICE'S NETWORK ADDRESS

TECHNICAL FIELD

The system and method relate to packet systems and methods and in particular to systems and methods for sending packets.

BACKGROUND

Currently, there are a variety of devices that can sniff/monitor a network path to determine the packet traffic on a portion of a network. These devices are called "sniffers", network analyzers, and the like. Their purpose is to help diagnose and troubleshoot a network. Typically, a network analyzer is used to passively monitor a network by bridging a network path. The packets that the network analyzer sees on the network path are displayed to a technician to help diagnose the network. When a network analyzer passively monitors a network path, a network address is not needed because the network analyzer does not send packets.

Network analyzers that are capable of sending packets are configured with a unique network address in order to send packets on a network that originate from the network analyzer. The unique address is used to communicate with other devices. Configuring a network address in a network analyzer can be difficult, time consuming, and expensive. For example, if the network uses static addresses, the network analyzer has to be configured manually. If the technician enters the wrong IP address, configuration errors can occur. In cases where network addresses are limited, using a network address for a network analyzer may not be an option. If the network uses Dynamic Host Configuration Protocol (DHCP), the network analyzer must support DHCP in order to be configured dynamically. In addition, the DHCP addresses may be provided only to requesting devices where their MAC address has been entered into a database for the purpose of security, thus adding an extra layer of administration.

Other systems such as described in U.S. Patent Application Publication 2002/0021680 disclose a method for tunneling packets in order to send the packets across the network. However, tunneling has the same problem: the sending device must be configured with a unique network address in order to tunnel and send a packet across a network. The problem with these systems and methods is that they do not provide a way to configure a network device (network analyzer) to send packets that originate in the network device without using a unique network address for the network device.

SUMMARY

The system and method are directed to solving these and other problems and disadvantages of the prior art. In a typical configuration, a network analyzer (that may or may not be configured with a network address) gets configuration information, usually in the form of a configuration packet sent from a network monitor. The configuration information comprises a second device network address and a third device network address. The second device network address is that of the network monitor and the third device network address is that of a communication device that is to be monitored.

When the network analyzer sees packets from the monitored communication device, the results can be sent to the network monitor for analysis without configuring a unique network address in the network analyzer. The network analyzer sends an original packet using the network address of the monitored communication device as the source address and the network address of the network monitor as the destination address. As a result, the network analyzer does not have to be configured with a unique network address. In a second embodiment, the network analyzer also gets a data-link (MAC) address from a packet sent by the network monitor and a data-link (MAC) address from the monitored communication device and uses them instead of or in addition to the network addresses to send the original packet to the network monitor.

BRIEF DESCRIPTION OF THE DRAWING

These and other features and advantages of the system and method will become more apparent from considering the following description of an illustrative embodiment of the system and method together with the drawing, in which.

DETAILED DESCRIPTION

Figure 1:
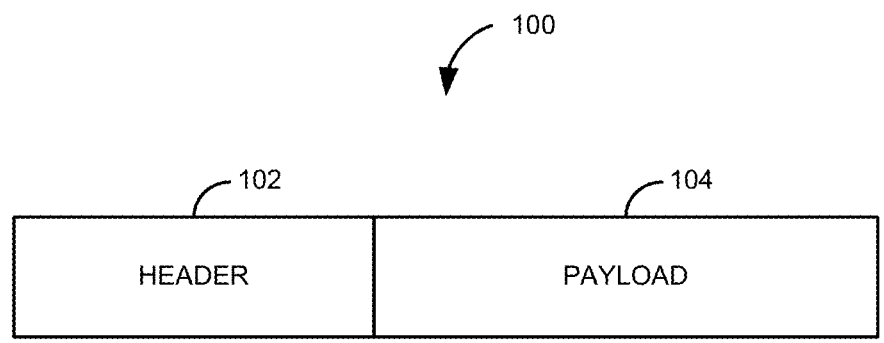
FIG. 1 is a block diagram of a typical packet.

FIG. 1 is a block diagram of a typical packet 100. The packet 100 comprises a header 102 and a payload 104. The header 102 comprises one or more fields. A field may be for example, a Transport Communication Protocol (TCP) port address, a User Datagram Protocol (UDP) port address, an Internetwork Packet Exchange (IPX) socket, an IP network address, a Media Access Control (MAC) address, an Ethernet address, a sequence number, and the like. The payload 104 can contain data that is used by an application such as a telephone (e.g., compressed voice in Session Initiation Protocol (SIP) packets).

Figure 2:
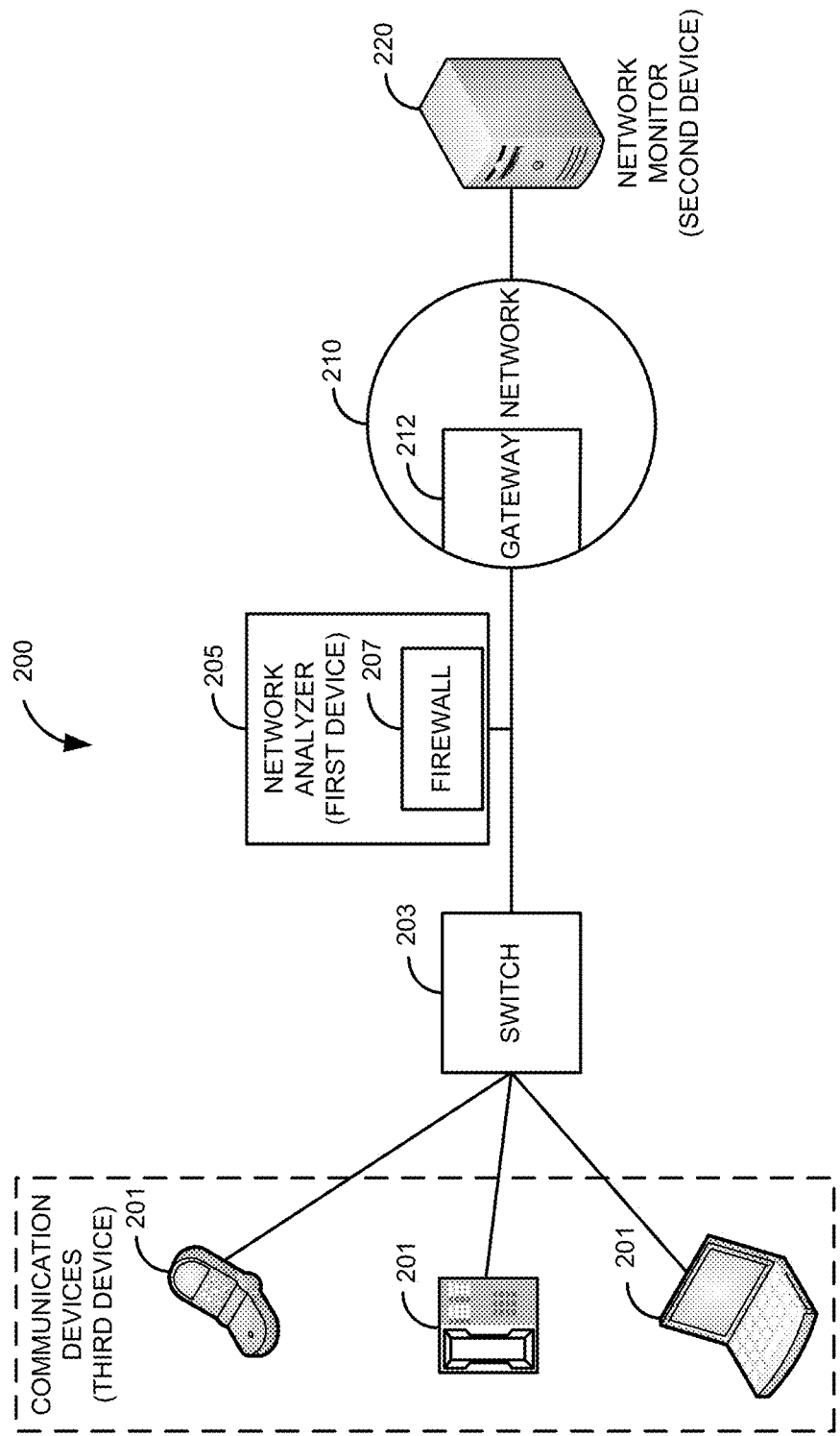
FIG. 2 is a block diagram of a first illustrative system for sending original packets without using a configured network address.

FIG. 2 is a block diagram of a first illustrative system 200 for sending original packets without using a configured network address. The first illustrative system 200 comprises communication devices 201, a switch 203, a network analyzer 205, a network 210, and a network monitor 220. The communication devices 201 can be any type of device that can send and receive packets 100 such as a telephone, a cellular telephone, a personal computer, a switch 203, a server, a router, and the like. The switch 203 can be any device capable of switching and/or routing packets 100.

The network analyzer 205 can be any device capable of monitoring packets 100 on a network 210. For example, the network analyzer 205 can be a personal computer with a Local Area Network (LAN) card in promiscuous mode, a sniffer, or any device capable of monitoring packets 100 on a network 210 or segment of a network. The network analyzer 205 is shown in a "T" configuration. However, one skilled in the art will recognize that the network analyzer 205 can work in a series configuration as well. The network analyzer 205 can be in a communication device 201. The network analyzer 205 optionally comprises a firewall 207. The network analyzer may or may not be configured with a network address. The firewall 207 is any device or application that can be configured to allow/block packets 100 sent to a particular network address, data-link address, port, socket, and the like.

The network 210 can be any type of network such as the Internet, an Ethernet network, a LAN, a Wide Area Network (WAN), a token-ring network, a SONET network, a token-bus network, and the like. The network 210 can comprise multiple networks. The network 210 typically comprises a gateway 212. The gateway 212 may be any type of device capable of interfacing between networks such as a router and the like. The network monitor 220 can be any device capable of sending and receiving packets 100 such as a server, a personal computer, a Private Branch Exchange (PBX), and the like.

The first illustrative system 200 typically comprises at least one communication device 201 (third device), the network analyzer 205 (first device), and the network monitor 220 (second device). Typically, the network analyzer 205 is configured by the network monitor 220 to monitor one or more communication devices 201. The network monitor 220 can configure multiple network analyzers 205 to monitor multiple communication devices 201. The switch 203 is shown for convenience in describing the first illustrative system 200, but is not required for the first illustrative system 200 to work.

The network analyzer 205 is set up to get configuration information. The configuration information includes a configured network address of the network monitor 220 and a configured network address of a communication device 201. A network address can be configured in a device in a variety of ways. For example, the communication device's network addresses may be manually configured with a static IP address. The network monitor's network address can be configured using DHCP. A network address may be any type of address that allows routing of packets across a network 210 such as an IP address, an IPX address, and the like. A network address can be combinations of network and/or other addresses.

The configuration information can be preconfigured and stored in the network analyzer 205. Another way the network analyzer 205 can get the configuration information is by receiving a configuration packet that is sent from the network monitor 220. Since the network analyzer 205 is not configured with a network address, the network analyzer 205 uses a bridge that looks at each packet 100 to determine if a packet 100 is a configuration packet. The network analyzer 205 can determine if a packet 100 is a configuration packet in a variety of ways. For example, the network analyzer 205 can look at one or more fields in the header 102 of the packet 100. A registered/non-registered TCP/UDP port address or an IPX socket can be used to identify a configuration packet. In addition, the network analyzer 205 can also use information in the payload 104 of the packet 100 to identify a packet 100 as a configuration packet. For example, a text string in the payload 104 can be used in conjunction with a TCP/UDP port address to identify a configuration packet. The configuration packet has a source network address (the configured network address of the network monitor 220) and destination network address (the configured network address of a communication device 201). The network analyzer 205 gets the configuration information (the network address of the network monitor 220 and the network address of the communication device 201) from the header 102 of the configuration packet.

The network analyzer 205 generates an original packet 102 using the configuration information. An original packet is one that is generated in the network analyzer 205, not one that is forwarded/routed using the existing source/destination network addresses. Instead of using a configured network address of the network analyzer 205 (even though the network analyzer 205 may be configured with a network address) as is done in the prior art, the network analyzer 205 uses the network address of the communication device 201 as the source address and the network address of the network monitor 220 as the destination address. The network analyzer 205 can include other information about monitored packets in the generated original packet. The generated original packet is then sent to the network monitor 220. The network monitor 220 can then use the information in the original packet to monitor and diagnose packets sent to and from the communication device 201.

At this point, the network analyzer 205 will now look for both configuration packets and for any packets that are sent to or from the monitored communication device 201. The network analyzer 205 can send additional packets to the network monitor 220 upon receipt of a monitored packet from the communication device 201. The packet sent to the network monitor 220 can include additional information such as a timestamp of when the packet 100 from the communication device 201 was received, the payload 104 of the packet 100, fields in the packet header 102, and the like.

Figure 3:
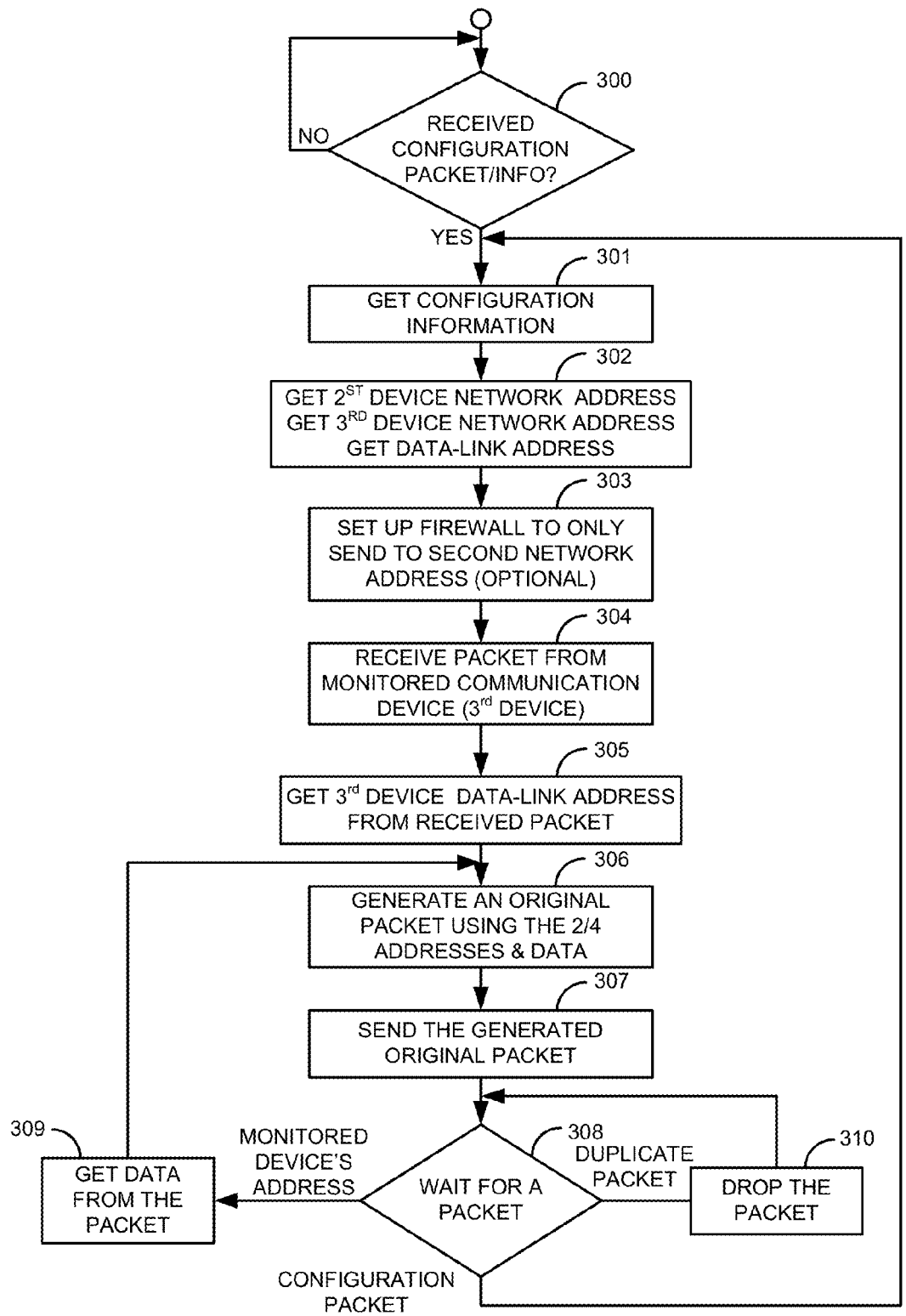
FIG. 3 is a flow diagram of a method for sending original packets without using a configured network address.

FIG. 3 is a flow diagram of a method for sending original packets without using a configured network address. Illustratively, the communication devices 201, the network analyzer 205 and the network monitor 220 are stored-program-controlled entities, such as a computer which performs the method of FIG. 3 by executing a program stored in a storage medium, such as a memory or disk.

The network analyzer 205 waits 300 to receive a configuration packet with configuration information from the network monitor 220. The network analyzer 205 gets 301 the configuration information from the configuration packet. The configuration information contains a configured network address of the network monitor 220 and a configured network address of a communication device 201 to be monitored.

In addition, the configuration packet can include data-link addresses such as a Media Access Control (MAC) address. A data-link address can be an Ethernet address, a token-ring address, a SONET address, a token-bus address, and the like. The data-link address (first data-link address) is typically the data-link address of the gateway 212. This is because data-link addresses are local to a network 210 and are changed as packets 100 flow between networks 210 to indicate the device on the network that sent the packet 100. When a configuration packet is received at the network analyzer 205 from the network monitor 220, the configuration packet will typically have a source data-link address of the gateway 212, the source address of the network monitor 220, and the destination network address of the communication device 201. If the network analyzer 205 is on the same network 210, the data-link address (first data-link address) will be the data-link address of the network monitor 220.

The network analyzer 205 gets 302 the network address of the network monitor 220, the network address of the monitored communication device 201, and the data-link address of the gateway 212/network monitor 220 from the configuration packet. The network analyzer 205 can optionally set up 303 the firewall 207 to only send packets to the network monitor 220. The firewall 207 is used to block other packets that may be sent such as ARP and ICMP packets. In a preferred embodiment, where a full TCP/UDP/IP stack is implemented, the firewall 207 will be set up unless the network analyzer is in the monitored communication device 201. The network analyzer 205 waits to receive 304 a packet from the monitored communication device 201. The network analyzer 205 gets 305 the data-link address (second data-link address) of the monitored communication device 201 (if the data-link addresses are used) from the header 102 of the received packet from the monitored communication device 201. The data-link address in the packet (second data-link address) from the communication device 201 can be the data-link address of a gateway (not shown) if the communication device 201 is on a different network (not shown) than the network analyzer 205.

The network analyzer 205 generates 306 an original packet with a source address of the monitored communication device 201, a destination address of the network monitor 220, and optionally, a source data-link address of the monitored communication device 201/gateway (not shown), and a destination data-link address of the gateway 212/network monitor 220. The original packet can also contain data to be sent to the network monitor 220. The data can be data from a packet that is sent from the communication device 201 that is received in step 304 and/or steps 308 and 309. The data can be other data that the network analyzer 205 needs to send to the network monitor 220. The network analyzer 205 sends 307 the generated original packet to the network monitor 220.

The network monitor 220 waits 308 for a packet. At this point, the network analyzer 205 is looking for a second configuration packet, a packet that is sent to or from the communication device 201, or a duplicate packet of the packet sent in step 307. When a LAN card is in promiscuous mode, all packets that are on the network path, including those sent by the network analyzer 205, are seen by the network analyzer 205. If a packet is detected in step 308 that is a duplicate packet of the packet sent in step 307, the packet is dropped 310 and the network analyzer 205 waits 308 for a packet.

If the packet has the network address (source or destination network address) of the monitored communication device 201 and is not a configuration packet, the network analyzer 205 gets 309 data from the packet and then goes to step 306. The data from the packet can be fields in the header 102 of the packet, the header 102 of the packet, data from the payload 104 of the packet, the whole packet, or any combination of these. When the process goes to step 306, a generated packet can be sent 307 for every packet that is received from or sent to the monitored communication device 201 in step 304/309, or information about multiple packets from the monitored communication device 201 can be stored up and sent in one packet in step 307. If the packet in step 308 is a configuration packet, the network analyzer 205 gets 301 configuration information from the configuration packet.

The above description depicts an environment using communication devices 201, a network analyzer 205, and a network monitor 220. This embodiment is but one of many implementations that can be envisioned for the use of this system and method. Of course, various changes and modifications to the illustrative embodiment described above will be apparent to those skilled in the art. For example, the network analyzer could be implemended in a switch or router. Other uses of the system and method can include detecting lost or misplaced devices. Configuration packets can be sent out until the lost or misplaced device is detected. This can be useful for devices such as IP phones that can be moved from office to office. These changes and modifications can be made without departing from the spirit and the scope of the system and method and without diminishing its attendant advantages. It is therefore intended that such changes and modifications be covered by the following claims except insofar as limited by the prior art.

What is claimed is:

1. A system comprising:
 a first device configured to receive a first configuration packet that contains configuration information from a network monitor, get the configuration information comprising a configured network address of a second device and a configured network address of a third device, wherein the first device does not have a network address, generate an original packet comprising a source network address that is the network address of the third device and a destination network address that is the network address of the second device, send the original packet, receive a packet, determine if the received packet is a second configuration packet, the sent original packet, or a packet that has the source network address or the destination network address of the third device, in response to the received packet being the second configuration packet, get a second configuration information from the second configuration packet, in response to the received packet being the sent original packet, ignoring the received packet, and in response to the received packet being the packet that has the source address network address or the destination network address of the third device, send a packet that comprises the source network address and the destination network address.

2. The system of claim 1, wherein the network address of the second device further comprises a first data-link address, wherein the first device is further configured to receive a packet from the third device and get a second data-link address from the packet received from the third device, and wherein the sent original packet further comprises a source data-link address that is the second data-link address and a destination data-link address that is the first data-link address.

3. The system of claim 2, wherein the sent original packet contains additional information from the packet received from the third device.

4. The system of claim 2, wherein the destination data-link address is the data-link address of a gateway or a network monitor on a same network as the first device.

5. The system of claim 2, wherein the source data-link address is the data-link address of a gateway or a communication device on a same network as the first device.

6. The system of claim 2, wherein the source data-link address or the destination data-link address is at least one item selected from the group comprising: a MAC address, an Ethernet address, a token-ring address, a SONET address, and a token-bus address.

7. The system of claim 1, wherein the first configuration packet or the second configuration packet is detected from at least one field of the configuration packet selected from the group comprising: a TCP port address, a UDP port address, an IPX socket, a field within a payload, and the payload.

8. The system of claim 1, further comprising a firewall configured to allow packets to be sent only to the second device.

9. The system of claim 1, wherein the first device is a network analyzer, the second device is a first communication device, and the third device is a second communication device.

10. The system of claim 1, wherein the source network address or the destination network address is at least one item selected from the group comprising: an IP address and an IPX address.

11. A method comprising:
 a. getting, configuration information, comprising a configured network address of a second device and a configured network address of a third device;
 b. generating an original packet comprising a source network address that is the configured network address of the third device and a destination network address that is the configured network address of the second device;
 c. sending the original packet from a first device, wherein the first device does not have a network address;
 d. receiving a first configuration packet that contains the configuration information from a network monitor;

e. receiving a packet;

f. determining if the received packet is a second configuration packet, the original packet sent in step (c), or a packet that has the source network address or the destination network address that is the configured network address of the third device;

g. responsive to the received packet being the second configuration packet, getting second configuration information from the second configuration packet;

h. responsive to the received packet being the packet sent in step (c), ignoring the received packet; and i. responsive to the received packet being the packet that has the source network address or the destination network address that is the configured network address of the third device, going to step (b).

12. The method of claim 11, wherein the network address of the second device further comprises a first data-link address; wherein the step of getting configuration information further comprises getting a second data-link address from a packet received from the third device; and wherein the sent original packet further comprises a source data-link address that is the second data-link address and a destination data-link address that is the first data-link address.

13. The method of claim 12, wherein the sent original packet contains additional information from the packet received from the third device.

14. The method of claim 12, wherein the destination data-link address is the data-link address of a gateway or the network monitor on a same network as the first device.

15. The method of claim 12, wherein the source data-link address is the data-link address of a gateway or a communication device on a same network as the first device.

16. The method of claim 12, wherein the source data-link address or the destination data-link address is at least one item selected from the group comprising: a MAC address, an Ethernet address, a token-ring address, a SONET address, and a token-bus address.

17. The method of claim 11, wherein the first configuration packet or the second configuration packet is detected from at least one field of the configuration packet selected from the group comprising: a TCP port address, a UDP port address, an IPX socket, a field within a payload, and the payload.

18. The method of claim 11, further comprising the step of: configuring a firewall to allow packets to be sent only to the second device.

19. The method of claim 11, wherein the first device is a network analyzer, the second device is a first communication device, and the third device is a second communication device.

20. The method of claim 11, wherein the source network address or the destination network address is at least one item selected from the group comprising: an IP address and an IPX address.

21. A method comprising:

a. receiving a configuration packet that contains configuration information on a first device that is not configured with a network address, wherein the configuration information comprises a configured network address of a second device, a configured network address of a third device, and a first data-link address;

b. receiving a packet from the third device;

c. getting a second data-link address from the packet from the third device;

d. generating an original packet, wherein the original packet comprises a source network address, a destination network address, a source data-link address, and a destination data-link address, wherein the source network address is the configured network address of the third device, the destination network address is the network address of the second device, the source data-link address is the second data-link address, and the destination data-link address the first data-link address; and e. sending the original packet from the first device.

22. An apparatus comprising:

means for receiving, at the first device, a first configuration packet that contains configuration information from a network monitor;

means for getting the configuration information, the configuration information comprising a configured network address of a second device and a configured network address of a third device;

means for generating an original packet comprising a source network address that is the configured network address of the third device and a destination network address that is the configured network address of the second device;

means for sending the original packet from a first device, wherein the first device does not have a network address;

means for receiving, at the first device, a packet;

means for determining if the received packet is a second configuration packet, the sent original packet, or a packet that has the source network address or the destination network address of the third device;

in response to the received packet being the second configuration packet, means for getting a second configuration information from the second configuration packet;

in response to the received packet being the sent original packet, means for ignoring the received packet; and in response to the received packet being the packet that has the source address network address or the destination network address of the third device, means for sending a packet that comprises the source network address and the destination network address.

* * * * *